No. 797,695. PATENTED AUG. 22, 1905.
C. W. LENDH.
WATER CLOSET CISTERN.
APPLICATION FILED MAR. 28, 1905.
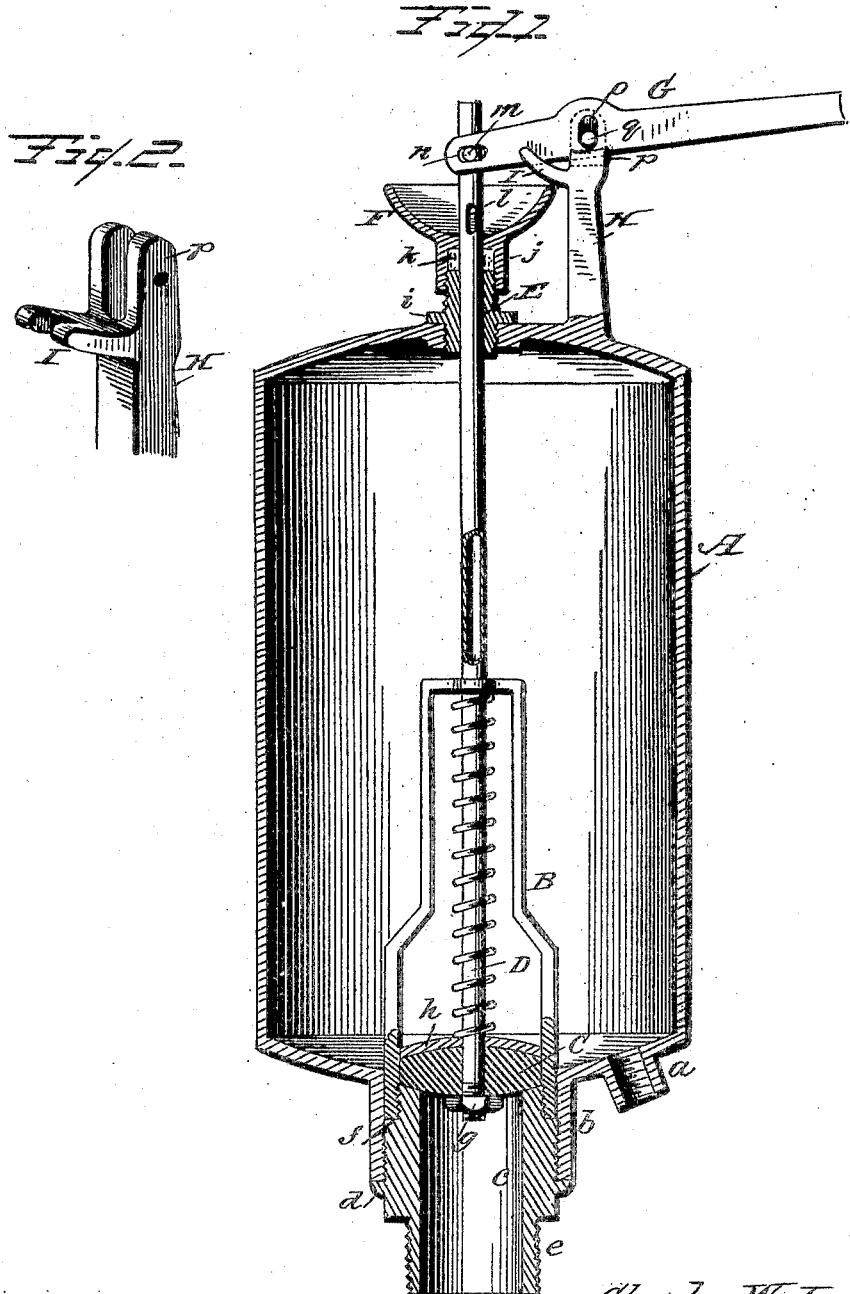

UNITED STATES PATENT OFFICE.

CHARLES W. LENDH, OF BROCKTON, MASSACHUSETTS.

WATER-CLOSET CISTERN.

No. 797,695.                 Specification of Letters Patent.                Patented Aug. 22, 1905.

Application filed March 28, 1905. Serial No. 252,503.

*To all whom it may concern:*

Be it known that I, CHARLES W. LENDH, a citizen of the United States, residing at Brockton, in the county of Plymouth and State of Massachusetts, have invented certain new and useful Improvements in Water-Closet Cisterns; and I do hereby declare that the following is a full, clear, and exact description of the same, reference being had to the annexed drawings, making a part of this specification, and to the letters of reference marked thereon.

The present invention has for its object to provide a tank for water-closets in which the discharge of water therein to the bowl of the closet is controlled by a suitable valve upon a tubular stem extending up through the tank and operated by a lever connecting therewith, and the purpose thereof is to materially improve the construction and operation of the parts, whereby a perfect and certain discharge of the water is obtained to flush the closet.

The invention consists in a water-closet cistern constructed substantially as shown in the drawings, and hereinafter described and claimed.

Figure 1 of the drawings is a vertical elevation of the cistern constructed in accordance with my invention and partly in section; Fig. 2, a perspective view of the upper end of the bracket to which the operating-lever is connected.

In the accompanying drawings, A represents a tank of any suitable size and capacity and either round or of other form found most preferable, and at its bottom is a screw-nipple *a* for connecting the tank to the source of supply.

At the bottom of the tank is a screw-coupling *b*, to which is connected by screw-threads a short pipe-section *c*, the external screw-threads thereof engaging the interior screw-threads of the coupling *b*, said pipe-section having a circumferential shoulder *d*, which abuts against the end of the coupling to form a tight joint.

The pipe-section *c* has a screw-threaded extension *e* for connecting it with the bowl of the closet through any of the ordinary means, and the upper end of the pipe-section is reduced in diameter to form a shoulder *f* and is screw-threaded to enable a guide-standard B to be connected through the medium of screw-threads thereon.

A convex valve C is secured to the end of a tubular stem D by means of a nut *g* engaging the screw-threaded end of the stem, the valve being preferably of an elastic material and protected at its upper side by a concave metal plate *h*, the upper end of the pipe-section *c* forming a seat for the valve.

The tubular valve-stem D has a coiled spring encircling the same, and its respective ends bear against the concave protecting-plate *h* and the upper end of the guide-standard B, through which the stem passes, thereby rendering the stem spring-actuated.

To the upper end of the tank A is secured a screw-nipple E, having a circumferential shoulder *i*, the lower screw-threaded end of the nipple engaging a screw-threaded opening in the tank, and that portion of the nipple above the shoulder having screw-threads enables a screw-threaded socket *j* to be connected thereto.

The screw-threaded socket *j* is formed integral with a waste-cup F and depends therefrom, and within the socket is a suitable packing *k*, through which the tubular stem D passes and extends above the cup, where it is connected with an operating-lever G.

The tubular stem D has an escape-opening *l* to allow the water that leaks into the cup F to pass down through the tubular stem into the bowl of the closet.

A bracket H supports the operating-lever G, which connects with the upper end of the tubular stem D by a pin *m* thereon engaging with an elongated slot *n* in the end of the lever, which slot is lengthwise of the lever, or horizontal, while the elongated slot *o* is transverse of the lever or vertical, one slot being horizontal and the other vertical. The upper end of the bracket is bifurcated, as shown at *p* in Fig. 2 of the drawings, and between the arms of this bifurcation is held the lever G through the medium of a pin *q*, which extends through the arm of the bifurcation and through the vertical slot *o*. The bracket H has a guide-yoke I, with which the operating-lever engages, so as to prevent any lateral movement thereof and disengage itself from the pin *n*.

The two slots *n o* in the lever being at right angles to each other, or one horizontal and the other vertical, enables the lever to work perfectly without binding of the parts, which in connection with the other operating parts of the tank provides a perfect and successful cistern for the flushing of water-closets.

The operating-lever G in its normal position rests at the juncture of the guide-yoke I, which serves as a fulcrum to the lever on the first movement thereof in order to lift the valve from its seat, and on the further downward movement of the lever through the medium of the slot $o$ the fulcrum will be transferred to the pin $q$.

Should the packing in the packing-box become worn or leak, the water will follow the hollow stem D up to the drip-cup F and then will run into the escape-opening $l$ and pass down through the tubular stem to the bowl of the closet.

Having now fully described my invention, what I claim as new, and desire to secure by Letters Patent, is—

1. A cistern for water-closets, comprising a suitable tank connecting with the supply and discharge, a valve to control the discharge, a spring-actuated valve-stem to which the valve is connected, a bracket upon the upper end of the tank having a bifurcation and a guide-yoke, an operating-lever having a horizontal and a vertical slot, said lever seated in the bifurcation of the bracket and engaging the guide-yoke, a pin in the bifurcation engaging the vertical slot and a pin on the valve-stem engaging the horizontal slot, substantially as and for the purpose described.

2. A cistern for water-closets, comprising a suitable tank having a screw-nipple at its lower end to connect with the source of supply, a screw-threaded pipe-section connecting a screw-coupling at the bottom of the tank to form a valve-seat and adapted for connection with the bowl of the closet, and a guide-standard held between the screw-coupling and pipe-section, a suitable valve and a tubular spring-actuated stem therefor, a screw-nipple connecting with the top of the tank and a waste-cup having a depending screw-threaded socket connecting the nipple, said valve-stem extending up through the nipple and cup and having an opening to take the water from the cup and conduct it down through the stem, and a bracket having a bifurcation and guide-yoke and an operating-lever engaging therewith and having horizontal and vertical slots with pins for securing it to the stem and bracket, substantially as and for the purpose specified.

In testimony whereof I affix my signature in presence of two witnesses.

CHARLES W. LENDH.

Witnesses:
 CHAS. BLODHOUS,
 OSCAR SMITH.